(12) United States Patent
Bivin

(10) Patent No.: US 7,513,273 B2
(45) Date of Patent: *Apr. 7, 2009

(54) FLUID FLOW CONTROL DEVICE

(75) Inventor: Donald B. Bivin, Oakland, CA (US)

(73) Assignee: BioQuiddity, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/008,159

(22) Filed: Jan. 7, 2008

(65) Prior Publication Data

US 2008/0169035 A1    Jul. 17, 2008

Related U.S. Application Data

(63) Continuation-in-part of application No. 11/317,805, filed on Dec. 23, 2005, now Pat. No. 7,316,245.

(51) Int. Cl.
*F15D 1/00* (2006.01)
(52) U.S. Cl. ............................ 138/37; 138/39; 366/337
(58) Field of Classification Search .................. 138/37, 138/39; 366/337
See application file for complete search history.

*Primary Examiner*—Patrick F Brinson

(57) ABSTRACT

A flow control device having no moving parts that controls fluid flow along a fluid pathway in such a way that flow rate remains constant irregardless of environmental changes. The device achieves a constant flow rate by taking advantage of the properties of the fluid moving along the fluid pathway and maintains the constant flow rate irregardless of changes in viscosity due to changes in temperature.

20 Claims, 8 Drawing Sheets

FLUID FLOW CONTROL DEVICE

This is a Continuation In Part Application of U.S. application Ser. No. 11/317,805 filed Dec. 23, 2005 now U.S. Pat. No. 7,316,245.

BACKGROUND OF THE INVENTION

1. Field of the Invention

The present invention relates generally to fluid flow control devices for controlling the flow of fluid along fluid flow pathways. More particularly, the invention concerns a highly novel fluid flow control device that has no moving parts and uniquely controls fluid flow by taking advantage of the properties of the fluid moving along the fluid flow pathway.

2. Discussion of the Prior Art

Various types of fluid flow control devices have been suggested in the past. Typically, these prior art devices use flow regulators, valves, diaphragms and like constructions all employing moving parts to achieve flow rate stabilization. Such constructions tend to be complex, costly and often of questionable reliability, particularly when used in medical applications.

Exemplary of a prior art flow regulator that embodies a deflectable beam placed within the fluid flow path is that described in U.S. Pat. No. 5,163,920 issued to Olive. The Olive device comprises a beam structure that is placed in the fluid flow path between an inlet and an outlet in a miniaturized housing. A flow gap defined between the beam and the housing provides a pressure differential between the faces of the beam which causes deflection and thus varies the fluid flow through the gap.

U.S. Pat. No. 3,438,389 issued to Lupin describes a flow metering orifice with automatic compensation for change in viscosity. Compensation for changes in viscosity in the Lupin device is effected by a movable valve element that shifts to increase the effective flow area as the viscosity of the fluid increases and to decrease the effective flow when the viscosity decreases.

The thrust of the present invention is to provide a highly novel flow control device that is of simple construction and design and is significantly more reliable than prior art flow control devices of conventional design. More particularly, the device of the present invention uniquely achieves flow rate stabilization by taking advantage of the properties of the moving fluid alone. In this regard, it is known that under certain circumstances eddy currents are generated as fluid moves past obstacles in the fluid flow path and the shape and magnitude of such eddies depend on the viscosity of the fluid. Further, it has been observed that the eddies themselves can be responsible for impeding the flow of fluid. Thus, arranging the size and position of obstacles in the fluid flow path can serve to provide viscosity dependent resistance to the flow of fluid. Therefore, the present inventor has determined that it is possible to design the fluid path so that the fluid flowing along the fluid path will generate its own regulation.

With the forgoing in mind, it is apparent that the method of flow rate stabilization contemplated by the present invention is fundamentally different in character from the prior art flow rate regulators that embody moving parts. Advantageously, because the devices of the present invention have no moving parts their manufacture is substantially easier and less expensive than conventional prior art flow rate stabilization devices.

An example of one form of a flow rate stabilization system contemplated by present invention comprises a device having a simple set of vanes or collars protruding from the sides of otherwise straight channels to provide for the delivery of fluid at a rate independent of viscosity. The vanes or collars of the device either have dimensions (primarily the dimension perpendicular to the current flow) or elastic constants relatively large so that under normal operating conditions their position and dimensions are constant. Advantageously, these types of vanes are quite easy to incorporate into an injection molded fluidic chip in which the vanes are merely an especially molded feature protruding from the walls of the fluid flow channel.

SUMMARY OF THE INVENTION

It is an object of the invention to provide a flow control device having no moving parts that controls fluid flow along a fluid pathway in such a way that flow rate remains constant irregardless of environmental changes.

Another object of the invention is to provide a device of the aforementioned character that achieves flow rate stabilization by taking advantage of the properties of the fluid moving along the fluid pathway.

Another object of the invention is to provide a device as heretofore described that maintains flow rate irregardless of changes in viscosity due to changes in temperature.

Another object of the invention is to provide a flow control device of the class described that includes means for generating eddy currents in the fluid to provide viscosity dependent resistance to fluid flow along the fluid pathway.

Another object of the invention is to provide strategically placed fixed obstacles within the fluid flow path for the purpose of controllably producing eddies.

Another object of the invention is to provide a flow control device of the character described in the preceding paragraph in which the means for generating eddy currents comprise a stationary vane protruding from a wall of a channel that defines the fluid pathway.

Another object of the invention is to provide a micro-fluidic device that includes a rigid vane of a character that is easy to incorporate into a fluidic chip having a fluid pathway in the form of a micro-channel.

Another object of the invention is to provide a flow control device of the type descried in the preceding paragraphs which, because of the absence of moving parts, can be manufactured more inexpensively than conventional prior art flow control devices.

DESCRIPTION OF THE INVENTION

Figure 1:
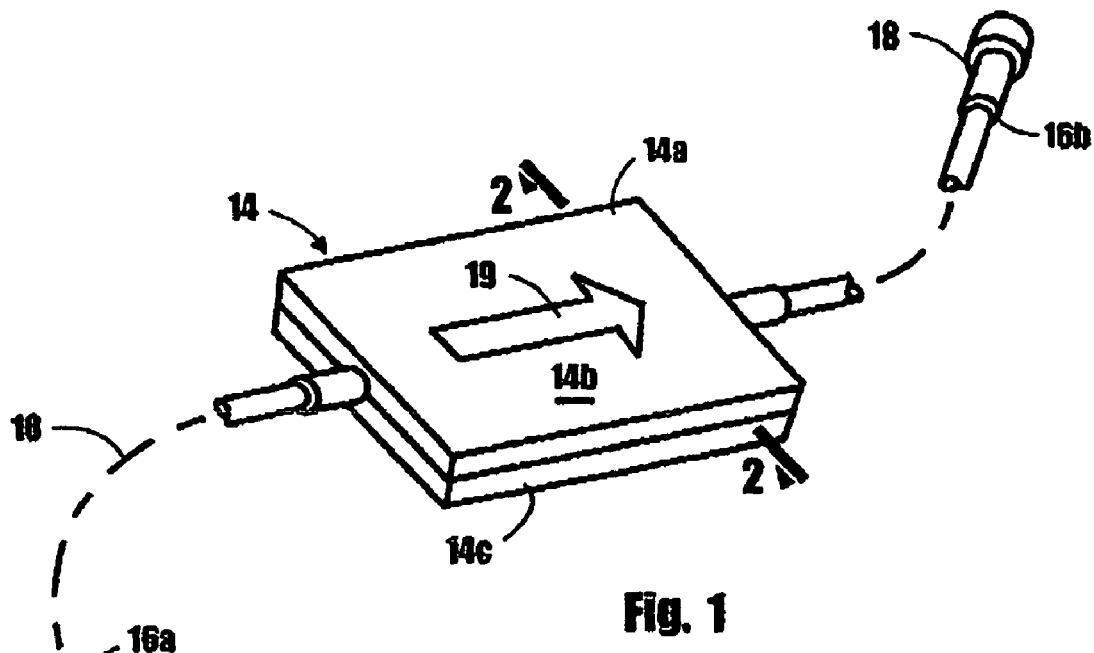
FIG. 1 is a generally perspective view of a fluid system embodying one form of the flow control device of the present invention.

Definitions: As used herein, the following terms have the following meanings:

Micro-Fluidic Device

A micro-fluidic device can be identified by the fact that it has one or more channels with at least one dimension less than 1 mm. Common fluids used in micro-fluidic devices include whole blood samples, bacterial cell suspensions, protein or antibody solutions and various buffers. Micro-fluidic devices can be used to obtain a variety of interesting measurements including molecular diffusion coefficients, fluid viscosity, pH, chemical binding coefficients and enzyme reaction kinetics. Other applications for micro-fluidic devices include capillary electrophoresis, iso-electric focusing, immunoassays, flow cytometry, sample injection of proteins for analysis via mass spectrometry and chemical gradient formation. Many of these applications have utility for clinical diagnostics. The use of micro-fluidic devices to conduct biomedical research and create clinically useful technologies has a number of significant advantages. First, because the volume of fluids within these channels is very small, usually several nanoliters, the amount of reagents and analytes used is quite small. This is especially significant for expensive reagents. The fabrications techniques used to construct micro-fluidic devices are relatively inexpensive and are very amenable both to highly elaborate, multiplexed devices and also to mass production. In a manner similar to that for micro-electronics, micro-fluidic technologies enable the fabrication of highly integrated devices for performing several different functions on the same substrate chip. The behavior of fluids at the micro-scale can differ from 'macro-fluidic' behavior in that factors such as surface tension, energy dissipation, and fluidic resistance start to dominate the system. Micro-fluidics studies how these behaviors change, and how they can be worked around, or exploited for new uses. At small scales (channel diameters of around 10 to several hundred micrometers) some interesting and unintuitive properties appear. Since the Reynolds number is typically extremely low in micro-fluidic channels, the flow will remain laminar. Thus, two fluids joining will not mix readily via turbulence, so diffusion alone must cause the two fluids to mingle.

Fluid Flow in Micro-Fluidic Devices—

The flow of a fluid through a micro-fluidic channel can be characterized by the Reynolds number, defined as $$Re = \frac{L\,V_{avg}\,r}{\mu}$$

where L is the most relevant length scale, $\mu$ is the viscosity, r is the fluid density, and $V_{avg}$ is the average velocity of the flow. For many micro-channels, L is equal to 4A/P where A is the cross sectional area of the channel and P is the wetted perimeter of a cross section taken perpendicular to the axis of the channel. Due to the small dimensions of micro-channels, the Re is usually much less than 100, often less than 1.0. In this Reynolds number regime, flow is completely laminar and no turbulence occurs (though eddies may occur). The transition to turbulent flow generally occurs in the range of Reynolds number 2000. Laminar flow provides a means by which molecules can be transported in a relatively predictable manner through micro-channels.

Definition of a Fluid

A substance, in the fluid state of matter having no fixed shape but rather a fixed volume. As a continuous, amorphous substance whose molecules move freely past one another, it has the tendency to assume the shape of its container and can be either a liquid or gas.

Definition of an Eddy Current

In fluid dynamics, an eddy is the swirling of a fluid and the reverse current created when the fluid flows past an obstacle. The moving fluid creates an "eddy".

Figure 2:
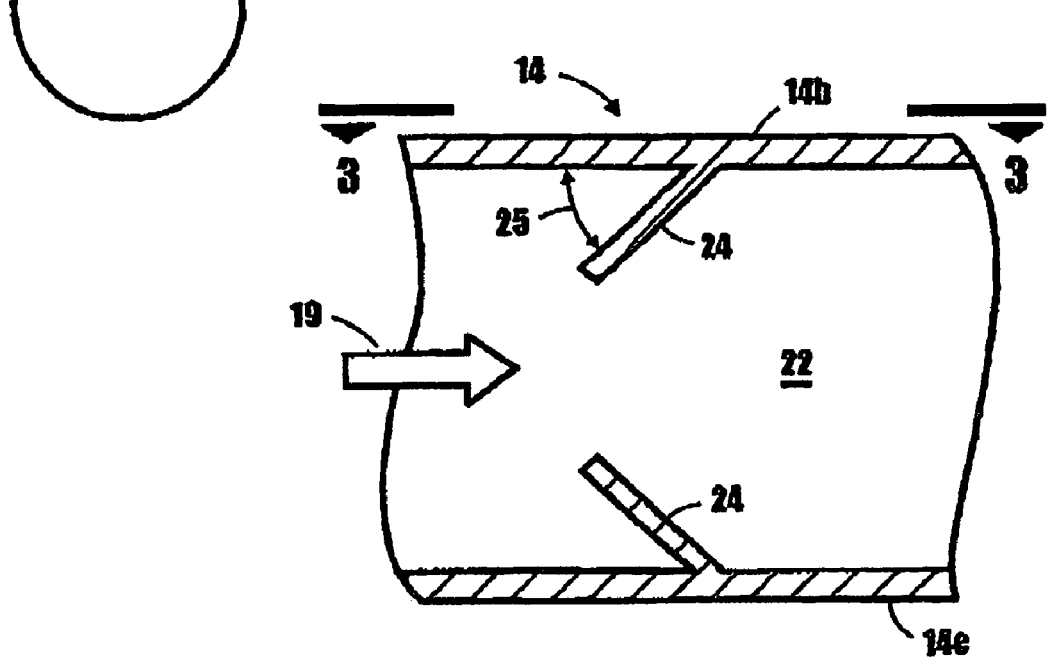
FIG. 2 is a greatly enlarged, cross-sectional view taken along lines 2-2 of FIG. 1.

Referring to the drawings and particularly to FIGS. 1 and 2, one form of the flow control device of the present invention is there illustrated and generally designated by the numeral 14. The flow control device 14, which is here shown as a fluidic micro-chip, is disposed within a fluid conduit 16, having a first end 16*a* that is interconnected with a source of fluid "S" and having a second end 16*b* that is interconnected with a conventional luer connector 18. Source "S" can be any type of a source of fluid, such as, by way of non-limiting example, a device for dispensing medicinal fluids, that delivers fluid under pressure into conduit 16 and through device 14 along a fluid pathway 22 in the direction of the arrow 19 (FIG. 2). Disposed within fluid pathway 22, which here comprises a micro-channel, is means for achieving flow rate stabilization, which means is here shown as a pair of spaced-apart obstacles comprising stationary vanes 24.

As illustrated in the drawings, microchip 14 includes a housing 14*a* having top and bottom walls 14*b* and 14*c*. As best seen in FIG. 2, vanes 24, which are interconnected with top and bottom walls 14*b* and 14*c*, extend into the fluid pathway 22 at an acute angle generally designated by the numeral 25. Angle 25 can vary depending upon the use to be made of the flow control device, but preferably is between about 15 and about 75 degrees. In this embodiment, vanes 24 are about 3 µm wide, 30 µm long and make an angle of about 45° with respect to the channel walls. The direction of flow is from left to right in the direction of the arrow.

It is to be understood that for any range of operating conditions the lengths of the vanes, the thickness of the vanes, the taper of the vanes, the cross-sectional profile of the vanes, the angle the vanes make with respect to the channel walls, their physical properties (for example, elastic moduli), will be selected. Further, the number of vanes per unit length or density of vanes per unit area will also be chosen to provide the desired stabilization for the range of environmental conditions under which the particular device is to operate.

In the embodiment of the invention illustrated in FIGS. 1 and 2, vanes 24 function to achieve flow rate stabilization by providing viscosity dependent resistance to fluid flow along fluid pathway 22. More particularly, vanes 24 are uniquely constructed and arranged so as to produce eddy currents within the fluid flowing along said fluid pathway, which eddy currents provide viscosity dependant resistance to the flow of fluid along the fluid flow path.

Figure 3:
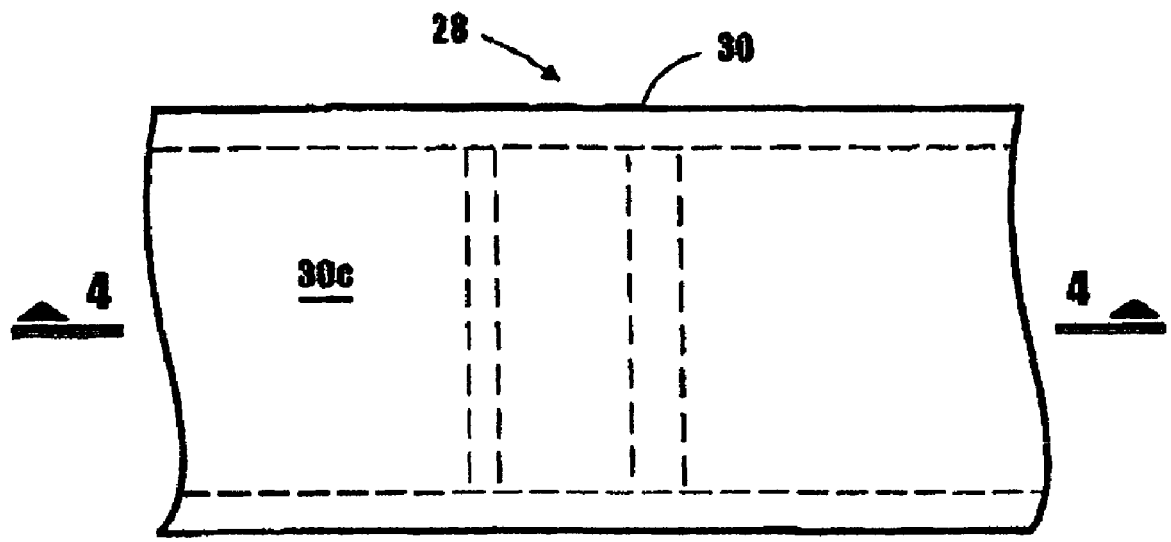
FIG. 3 is a top plan view of an alternate form of the flow control device of the present invention.
Figure 4:
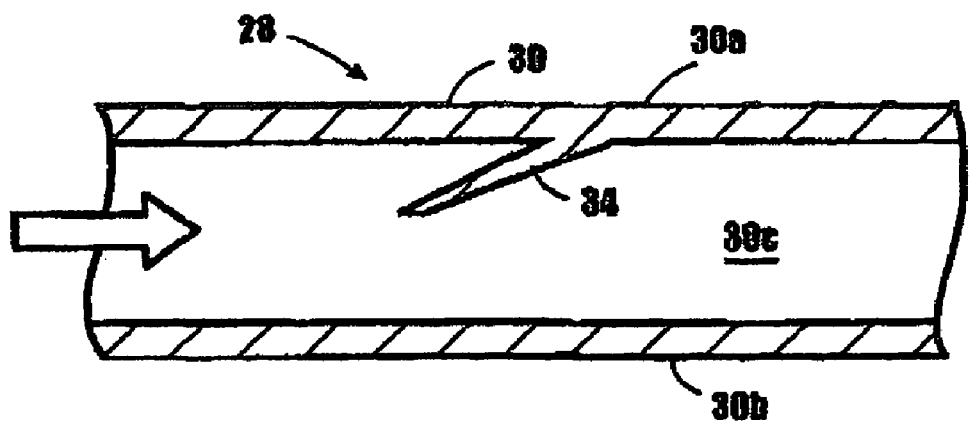
FIG. 4 is a cross-sectional view taken along lines 4-4 of FIG. 3.

Turning to FIGS. 3 and 4 of the drawings, an alternate form of flow control device of the invention is there shown and generally designated by the numeral 28. This device is similar in many respects to the previously described device and comprises a fluidic micro-chip 30 having top and bottom walls 30a and 30b which cooperate to define a fluid flow path, here depicted as a micro-channel 30c. In this alternate form of flow control device, only a single vane 34 extends into the flow path 30c. As best seen in FIG. 4, vane 34 is of a specially configured, tapered construction. Single vane 34 can be specially configured for particular end-use applications, but preferably has a length of between about 25 µm and about 1,000 µm and a thickness of between about 5 µm and about 100 µm. Various methods for forming vane 34 will be discussed in the paragraphs which follow.

It is to be understood that the thickness, length and taper of vane 34 may be varied to provide desired results. The angle at which the vane meets the wall of the channel can also be adjusted to produce the desired flow properties of the channel. The shape of the vane need not be of the simple geometric form as shown in FIG. 4 but could take any shape that the designer believed would produce the desired flow rates under conditions of the environmental parameters.

In the embodiment of the invention shown in FIGS. 3 and 4, the taper of the vane (the difference in thickness between the end of the vane at the wall and its free end) is about 10 µm at the wall and about 6 µm at the free end.

Figure 5:
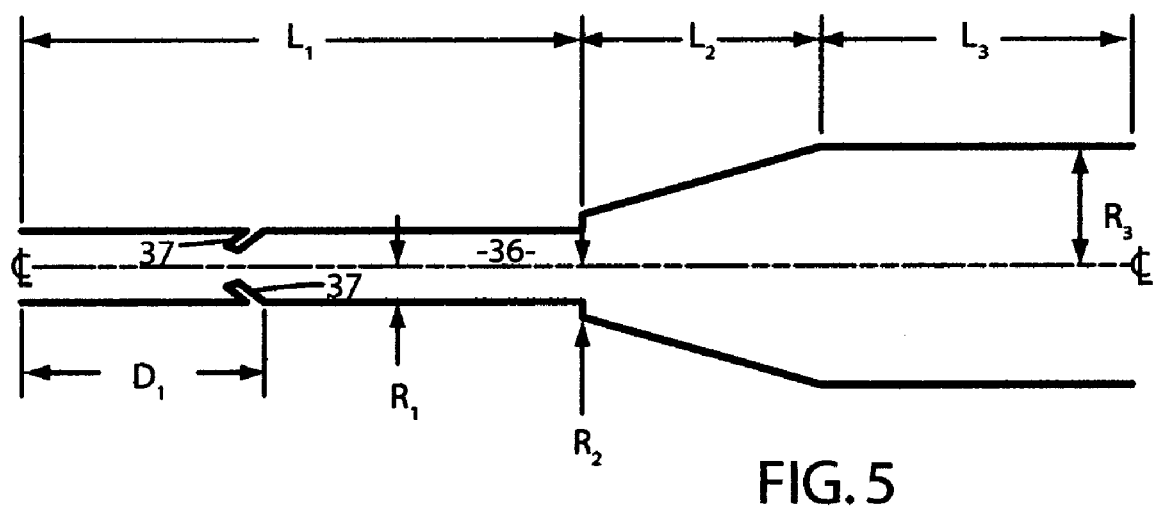
FIG. 5 and is a greatly enlarged, generally diagrammatic view of fluid flow channel of an alternate form of flow control device.

Turning to FIG. 5, this Figure depicts a longitudinal section along the axis of the cylindrically symmetric channel 36 formed in an alternate form of flow control device of the invention. In this instance, because of the axial symmetry of the channel, the vane 37 shown in FIG. 5 may be properly termed a "collar". However, when this "collar" is viewed sliced through its axis of symmetry it appears as two vanes in FIG. 5.

The various dimensions identified in FIG. 5 can be adjusted to provide for the desired flow rates at given input pressures. As depicted in FIG. 5, the first segment, which contains the vane comprises the stabilizer unit is identified as $L_1$. Similarly:

$L_2$=length of the second segment $L_3$=length of the third segment $R_1$=radius of the first segment $R_2$=initial radius of the second segment $R_3$=radius of the third segment; and $D_1$=distance to the vane.

The graphs below display the results of computations on systems similar to those above with various structural and environmental parameters listed below.

$L_1$=length of the first segment=1000 µm $L_2$=length of the second segment=42000 µm $L_3$=length of the third segment=60000 µm $R_1$=radius of the first segment=80 µm to 110 µm $R_2$=radius of the entrance to the second segment=85 µm to 115 µm $R_3$=radius of the third segment=800 µm $D_1$=distance to the vane=500 µm $L_v$=length of the vane=80 µm $t_b$=thickness of the vane at its base=10 µm $t_e$=thickness of the vane at its end=6 µm $\phi$=angle the vane makes with the wall of the channel=33°

Pressure=4.5 to $12.5 \times 10^{+3}$ N/m$^2$

Viscosity=5.5 or $11.0 \times 10^{-4}$ Kg/m sec

It is to be understood that the various dimensions identified in the preceding paragraph are merely exemplary and can be adjusted to provide for the desired flow rates at given input pressures.

Figure 6:
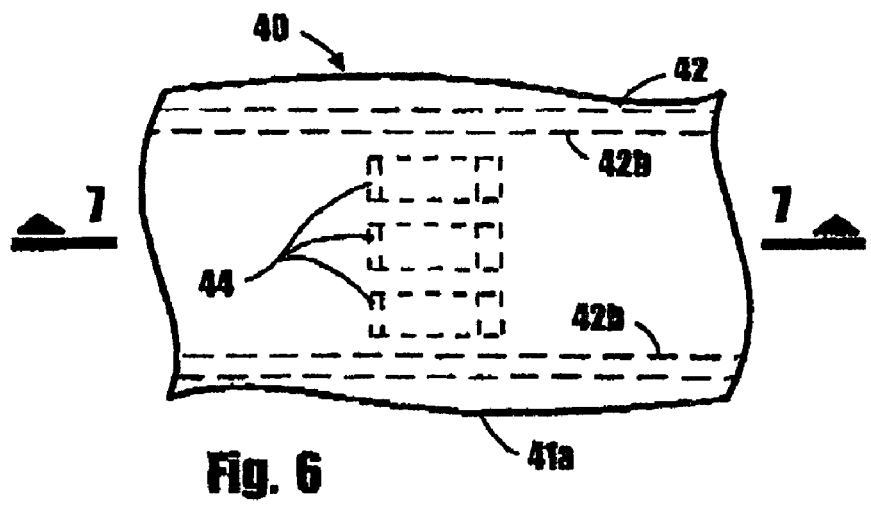
FIG. 6 is a top plan view of still another form of flow control device of the present invention.
Figure 7:
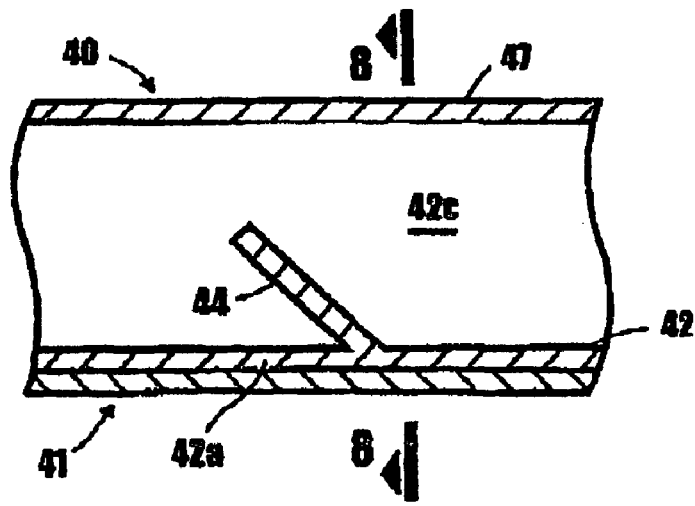
FIG. 7 is a cross-sectional view taken along lines 7-7 of FIG. 6.
Figure 8:
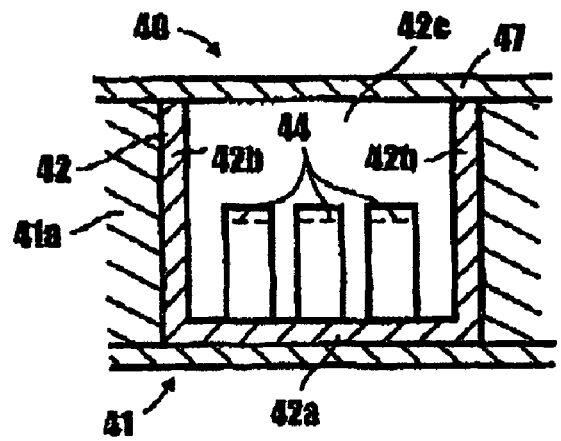
FIG. 8 is a cross-sectional view taken along lines 8-8 of FIG. 7.

Turning to FIGS. 6, 7 and 8 of the drawings, still another form of flow control device of the invention is there shown and generally designated by the numeral 40. This device is similar in many respects to the devices described in the preceding paragraphs and comprises a fluidic micro-chip 42 having walls 42a and 42b which cooperate to define a fluid flow path, here depicted as a micro-channel 42c. In this alternate form of flow control device, a plurality of transversely spaced-apart vanes 44 extend from bottom wall 42a into the flow path, or micro-channel 42c (FIGS. 7 and 8). Like single vane 34, vanes 44 can be specially configured for particular end-use applications, but preferably have a length of between about 25 µm and about 1,000 µm and a thickness of between about 5 µm and about 100 µm. It is to be understood that vanes 44 can be symmetrically or randomly positioned along the flow path.

Figure 9:
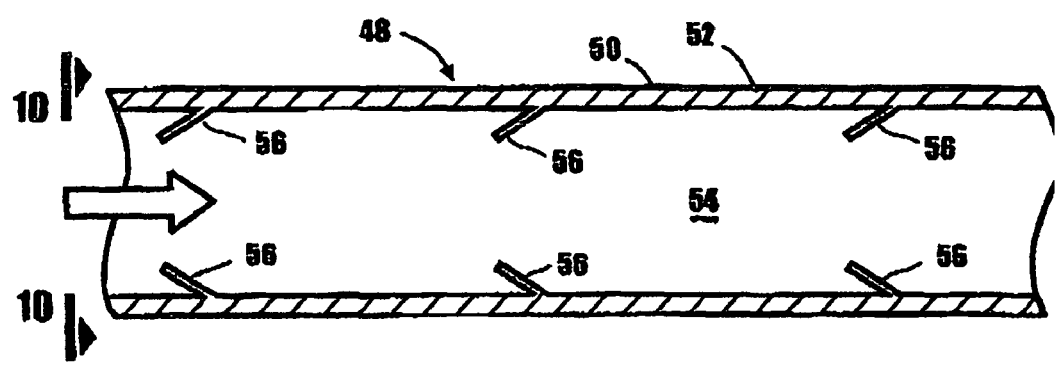
FIG. 9 is a greatly enlarged, longitudinal, cross-sectional view of still another form of the flow control device of the present invention.
Figure 10:
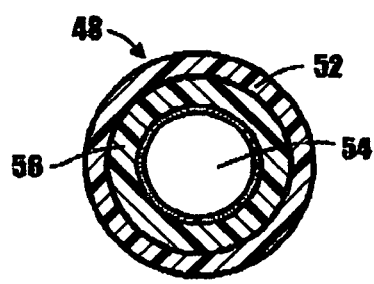
FIG. 10 is a cross-sectional view taken along lines 10-10 of FIG. 9.

Referring next to FIGS. 9 and 10, yet another alternate form of flow control device of the invention is there shown and generally designated by the numeral 48. This device, unlike the previously described devices, comprises a larger, generally tubular-shaped housing 50 having a sidewall 52 that defines a fluid flow path 54. In this latest form of flow control device, a plurality of longitudinally spaced-apart pairs of vanes or collars 56 extend from side wall 52 into the fluid flow path 54. Like single vane 34, vanes 56 can be specially configured for particular end-use applications. Although the array of vanes depicted in FIG. 9 is well-ordered this is not an essential feature of the invention and the designer might wish to populate the walls of the channel with vanes in a random fashion.

Figure 11:
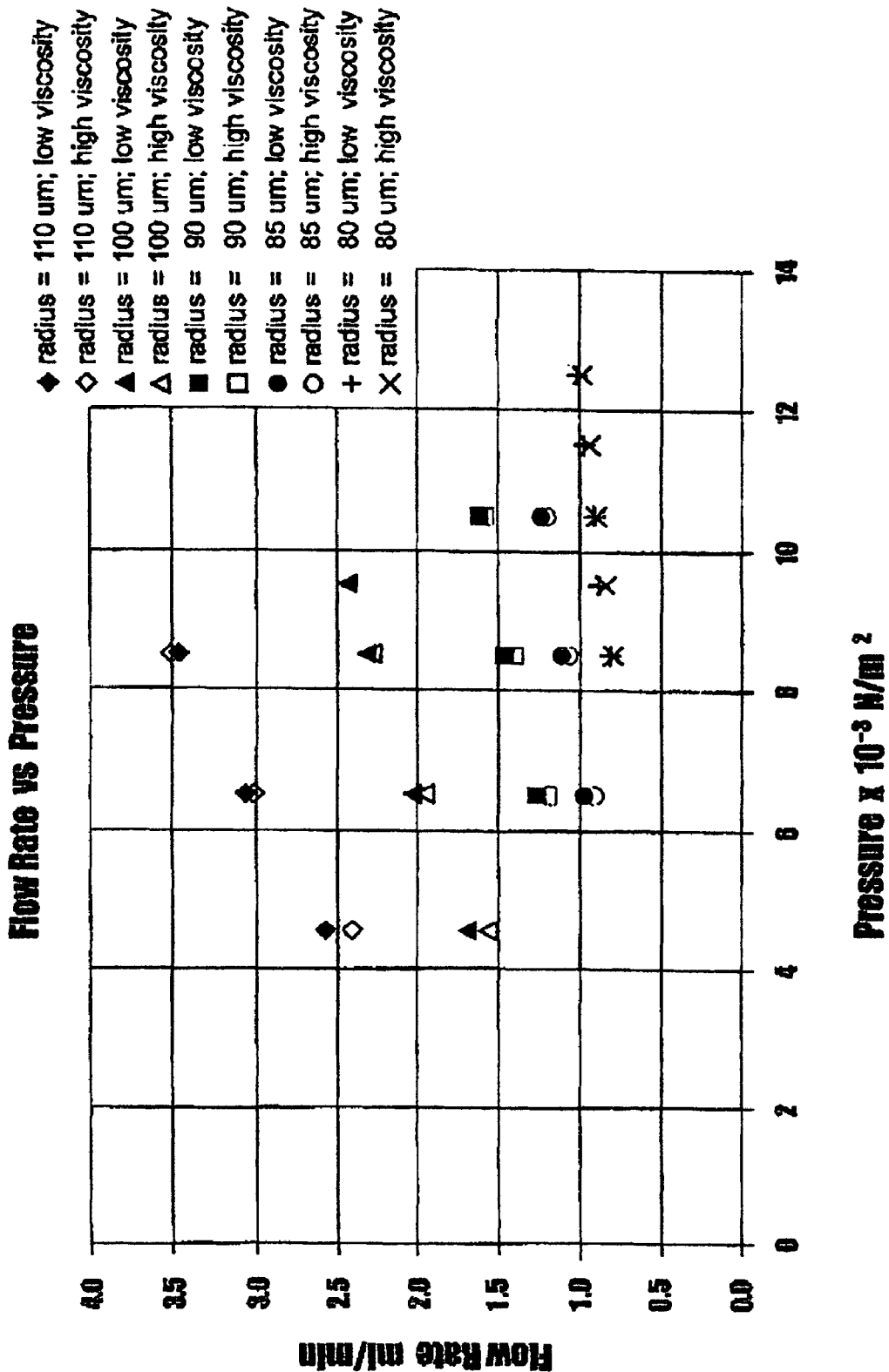
FIG. 11 is a generally graphical representation of fluid flow rate plotted against pressure.

Referring now to FIG. 11, this Figure displays the results of computations on systems similar to those described in the preceding paragraphs above and plots of flow rate vs. pressure.

It is apparent that the information contained in the graph of FIG. 11 can readily be used to design elements in a microfluidic network. For example, if one wanted the flow rate control device to deliver fluid at a flow rate of 1 ml/min, then reading directly from the graph of FIG. 11 one could choose a radius for the regulator of 80 µm and a pressure of $12.5 \times 10^3$ N/m$^2$ or a regulator with a radius of 85 µm and a pressure of $8.5 \times 10^3$ N/m$^2$. The fractional difference in flow rates for these two cases is $4 \times 10^{-2}$ vs. $3 \times 10^{-2}$. This is not a great difference in the flow rate with respect to changes in viscosity so either would be a reasonable choice.

On examination of the graph of FIG. 11 one should conclude that any particular flow rate can be achieved by many different geometries and pressures. For example, the graph indicates that flow rates of 1, 2 and 3 ml/min can be achieved using the range of pressures and geometries explicitly shown in the graph. In addition, it is obvious that the lines defined by flow rates vs. pressures for any given geometry can be extrapolated to other pressures to define systems that deliver fluid at pressures other than those explicitly shown in the graph.

Figure 12:
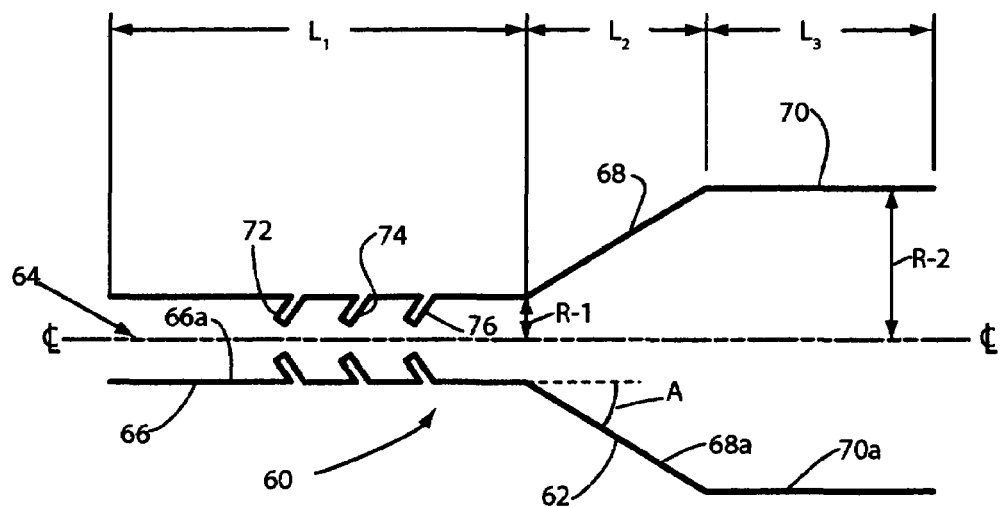
FIG. 12 is a greatly enlarged, generally diagrammatic view, similar to FIG. 5, showing yet another form of flow control device of the invention.

Turning to FIG. 12, still another form of flow control device of the invention is there shown and generally designated by the numeral 60. This device is similar in many respects to the flow control device shown in FIG. 5 and comprises a housing 62 that defines a fluid pathway 64, here shown as an elongated micro-channel. Housing 62 includes a first segment 66 having a length L-1 and an inner wall 66a, a second tapered segment 68 having a length L-2 and an inner wall 68a and a third segment 70 having a length L-3 and an inner wall 70a. As shown in FIG. 12, first segment 66 has a first radius and third segment 70 has a second radius greater than the first radius. As also illustrated in FIG. 12, the inner wall 68a of second tapered segment 68 extends from the inner wall 66a of the first segment 66 toward the inner wall 70a of the third segment 70 at an acute angle "A" of approximately 30 degrees. Tapered segment 68 has an initial radius "R-1" and a larger final radius that is substantially equal to the second radius "R-2" of the third segment 70.

Disposed within the fluid passageway of first segment 66 is means for achieving flow rate stabilization by providing viscosity dependent resistance to fluid flow along the fluid pathway. This important means here comprises three stationary vanes 72, 74 and 76 that protrude into the fluid pathway 64 and are so constructed and arranged to produce an eddy within the fluid flowing along said micro-channel. The vanes shown in FIG. 12 may be properly identified as "collars". However, when these "collars" are viewed sliced through the axis of symmetry they appears as six vanes.

As in the earlier described embodiments of the invention, the vanes can extend inwardly from wall 66a at an angle of between about 30 degrees and about 60 degrees. Additionally, it is to be understood that, if desired, the vanes can be tapered, can be of various thicknesses from between about 5 μm and about 100 μm. and can have a length of between about 50 μm and about 200 μm.

Once again, the various dimensions identified in FIG. 12 can be adjusted to provide for the desired flow rates at given input pressures. In this latest form of the invention the length of the first segment L-1 is approximately 40000 μm, the length of the second segment L-2 is approximately 25000 μm and the length of the third segment is approximately 28000 μm.

It is to be understood that the length of various segments of the device, as well as the angle the walls of the segment L-2 make with the axis of the first segment L-1, are an essential part of the design of a micro-fluidic device that delivers fluid at a flow rate that is substantially viscosity independent.

Figure 13:
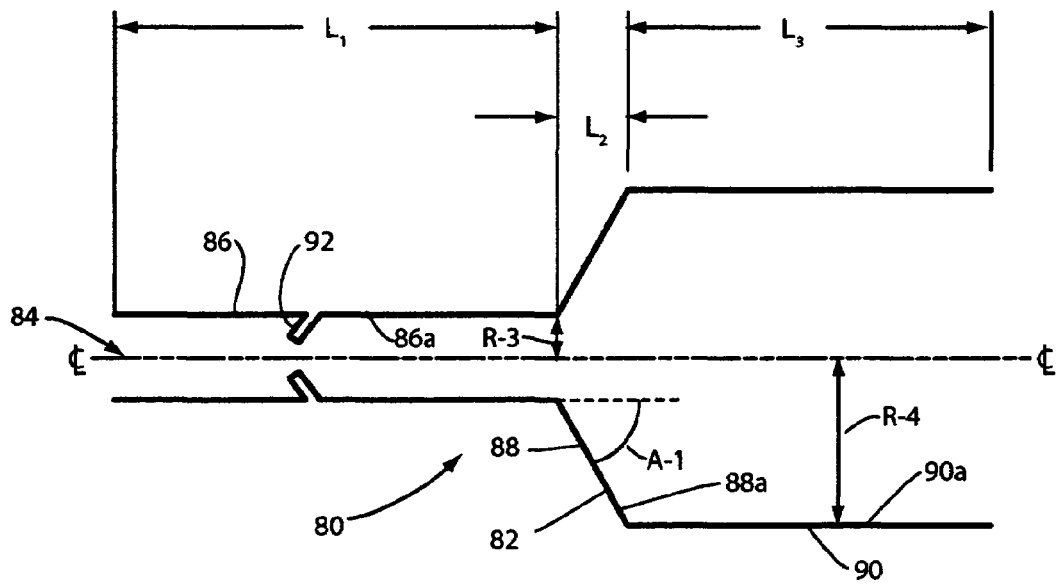
FIG. 13 is a greatly enlarged, generally diagrammatic view, similar to FIG. 5, showing still another form of flow control device of the invention.

Referring next to FIG. 13, yet another form of flow control device of the invention is there shown and generally designated by the numeral 80. This device is also similar in many respects to the flow control device shown in FIG. 5 and comprises a housing 82 that defines a fluid pathway 84, here shown as an elongated micro-channel. Housing 82 includes a first segment 86 having a length L-1 and an inner wall 86a, a second tapered segment 88 having a length L-2 and an inner wall 88a and a third segment 90 having a length L-3 and an inner wall 90a. As shown in FIG. 13, first segment 86 has a first radius and third segment 90 has a second radius greater than the first radius. As also illustrated in FIG. 13, the inner wall 88a of second tapered segment 88 extends from the inner wall 86a of the first segment 86 toward the inner wall 90a of the third segment 90 at an acute angle "A-1" of approximately 60 degrees. Tapered segment 88 has an initial radius "R-3" and a larger final radius that is substantially equal to the radius "R-4" of the third segment 90. Disposed within the fluid passageway of first segment 86 is means for achieving flow rate stabilization by providing viscosity dependent resistance to fluid flow along the fluid pathway. This important means here comprises a single stationary vane 92, that protrudes into the fluid pathway 84 and is so constructed and arranged to produce an eddy within the fluid flowing along said micro-channel. As before, the vane shown in FIG. 13 may be properly identified as a "collar". However, when the "collar" is viewed sliced through the axis of symmetry it appears as two vanes.

As in the earlier described embodiments of the invention, the vane can extend inwardly from wall 86a at an angle of between about 30 degrees and about 60 degrees. Additionally, it is to be understood that, if desired, the vane can be tapered, can be of various thicknesses from between about 5 μm and about 100 μm and can have a length of between about 50 μm and about 200 μm.

Once again, the various dimensions identified in FIG. 13 can be adjusted to provide for the desired flow rates at given input pressures. In this latest form of the invention the length of the first segment L-1 is approximately 40000 μm, the length of the second segment L-2 is approximately 8000 μm and the length of the third segment is approximately 35000 μm.

It is to be understood that the length of various segments of the device, as well as the angle the walls of the segment L-2 make with the axis of the first segment L-1, are an essential part of the design of a micro-fluidic device that delivers fluid at a flow rate that is substantially viscosity independent.

Figure 14:
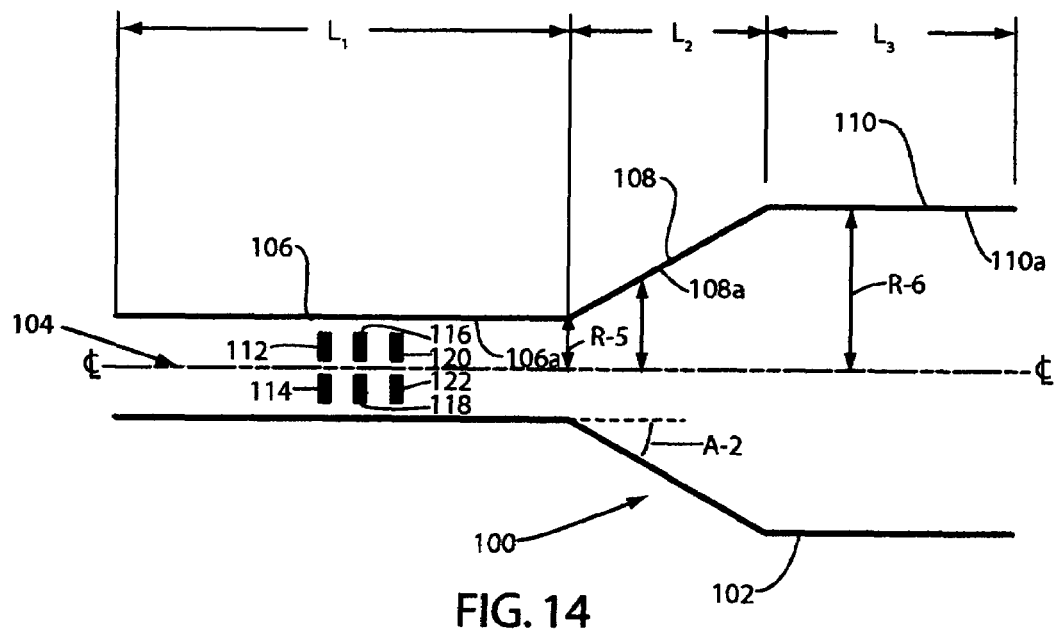
FIG. 14 and is a greatly enlarged, generally diagrammatic view, similar to FIG. 12, showing still another form of flow control device of the invention.

Turning to FIG. 14, still another form of flow control device of the invention is there shown and generally designated by the numeral 100. This device is also similar in many respects to the flow control device shown in FIG. 5 and comprises a housing 102 that defines a fluid pathway 104, here shown as an elongated micro-channel. Housing 102 includes a first segment 106 having a length L-1 and an inner wall 106a, a second tapered segment 108 having a length L-2 and an inner wall 108a and a third segment 110 having a length L-3 and an inner wall 110a. As shown in FIG. 14, first segment 106 has a first radius and third segment 110 has a second radius greater than the first radius. As also illustrated in FIG. 14, the inner wall 108a of second tapered segment 108 extends from the inner wall 106a of the first segment 106 toward the inner wall 110a of the third segment 110 at an acute angle "A-2" of approximately 30 degrees. Tapered segment 108 has an initial radius "R-5" and a larger final radius that is substantially equal to the second radius "R-6" of the third segment 110. Disposed within the fluid passageway of first segment 106 is means for achieving flow rate stabilization by providing viscosity dependent resistance to fluid flow along the fluid pathway. This important means here comprises six stationary vanes 112, 114, 116, 118, 120 and 122, that protrude from the bottom of the channel into the fluid pathway 104 and are so constructed and arranged to produce an eddy within the fluid flowing along the micro-channel. The vanes shown in FIG. 14 are both laterally and transversely spaced-apart from one another and are affixed to the lower wall of segment 106. However, it is to be understood that the vanes may also be randomly oriented as may be desired. As in the earlier described embodiments of the invention, the vanes can extend inwardly into the flow channel at any desired angle. Additionally, it is to be understood that, if desired, the vanes can be tapered, can be of various thicknesses from between about 5 µm and about 100 µm. and can have a length of between about 50 µm and about 200 µm.

Once again, the various dimensions identified in FIG. 14 can be adjusted to provide for the desired flow rates at given input pressures. In this latest form of the invention the length of the first segment L-1 is approximately 40000 µm, the length of the second segment L-2 is approximately 25000 µm and the length of the third segment is approximately 28000 µm.

It is to be understood that the length of various segments of the device, as well as the angle the walls of the segment L-2 make with the axis of the first segment L-1, are an essential part of the design of a micro-fluidic device that delivers fluid at a flow rate that is substantially viscosity independent.

Figure 15:
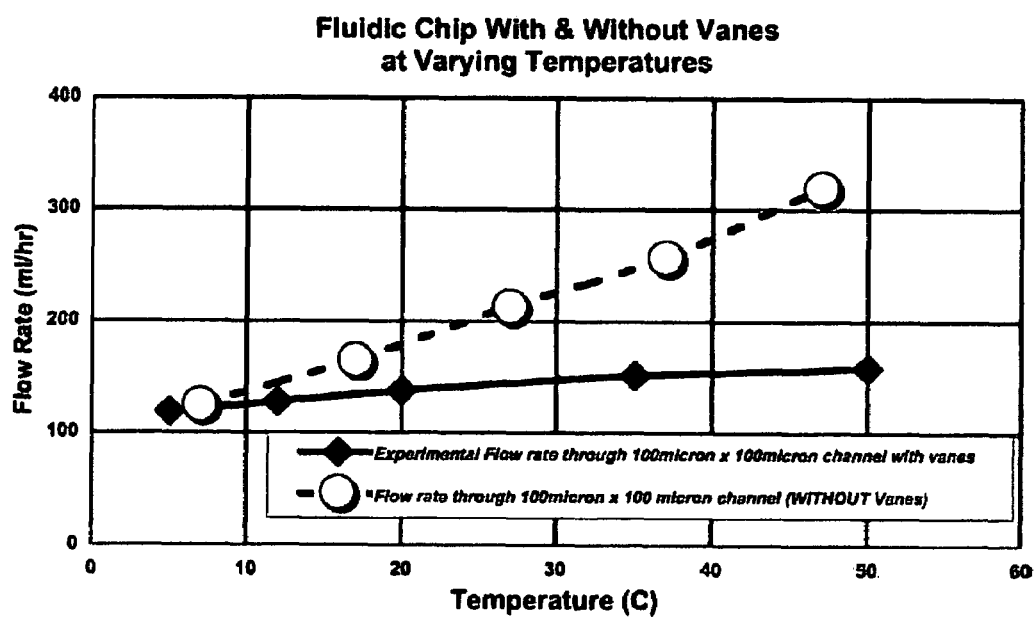
FIG. 15 is a generally graphical representation of fluid flow rate plotted against temperature.

Turning to FIG. 15, which is generally graphical representation of fluid flow rate plotted against temperature. The points that are indicated by diamonds are measured values of flow rates in a fluidic channel in which vanes protrude from its sides. The points indicated by circles are the expected flow rates in a similar channel that has no vanes protruding from its sides. Thus, this figure clearly illustrates how vanes that are strategically located within the first segment of the device function to modulate the fluid flow rate at varying temperatures.

The details of the construction of the flow rate stabilizing device and the various methods of making the flow rate stabilizing device will now be considered. With respect to the materials to be used in constructing the chip, medical grade polymers are the materials of choice. These types of polymers include thermoplastics, duroplastics, elastomers, polyurethanes, acrylics and epoxies. In other variations, the materials used for the flow rate stabilizing device may be made of glass, silica, or silicon. In further variations, the flow control component may be made of metals or inorganic oxides.

Using the foregoing materials, there are several ways that the flow rate stabilizing device can be made. These include injection molding, injection-compression molding, hot embossing, casting, laser ablation and like techniques well known to those skilled in the art. The techniques used to make the imbedded fluid channels are now commonplace in the field of micro-fluidics, which gave rise to the lab-on-a-chip, bio-MEMS and micro-total analysis systems (µ-TAS) industries. Additionally, depending on the size of the fluid channels required for a given flow rate, more conventional injection molding techniques can be used.

The first step in making the channel and vanes using an injection molding or embossing process is a lithographic step, which allows a precise pattern of channels to be printed on a "master" with lateral structure sizes down to 0.5 µm. Subsequently, electroforming is performed to produce the negative metal form, or mold insert. Alternatively for larger channel systems, precision milling can be used to make the die mold insert directly. Typical materials for the mold insert or embossing tool are nickel, nickel alloys, steel and brass. Once the mold insert is fabricated, the polymer of choice may be injection molded or embossed to yield the desired part with imprinted channel and vanes.

Alternatively, channels and vanes can be made by one of a variety of casting processes. In general, a liquid plastic resin, for example, a photopolymer can be applied to the surface of a metal master made by the techniques described in the preceding paragraph and then cured via thermal or ultraviolet (UV) means. After hardening, the material is then "released" from the mold to yield the desired part. Additionally, there are similar techniques available that utilize CAD data of the desired channel configuration and direct laser curing of a liquid monomer to yield a polymerized and solidified part with imbedded channels. This process is available by contract from, by way of example, MicroTEC, GmbH of Duisburg, Germany.

In order to seal the flow channel, a planar top plate may be used. In this instance, the channel system may be sealed with a top plate, which is here defined as any type of suitable cover that functions to seal the channels. The top plate may be sealably interconnected with the base plate which contains the flow channel by several means, including thermal bonding, sonic welding, laser welding, adhesive bonding with vacuum application and other bonding techniques using plasma deposition.

Thermal bonding may be performed by using a channel base plate material and planar top cover that are made of similar polymeric materials. In this case the two substrates are placed in contact with one another, confined mechanically and heated to 2-5° C. above their glass transition temperature. Following a holding period sufficient enough for the polymer molecules of the two surfaces to interpenetrate with one another, the temperature is slowly reduced and a stress-free bonded interface with imbedded micro channel and vanes is yielded.

Additionally, the top plate may be bonded to the base plate through the use of one or more suitable bonding materials or adhesives. The bonding material or adhesive may be of the thermo-melting variety or of the liquid or light curable variety. For thermo-melting adhesives, the adhesive material is melted into the two opposed surfaces, thereby interpenetrating these surfaces and creating a sealed channel structure.

Further, liquid curable bonding materials or adhesives and light curable bonding materials or adhesives may be applied to one of the surfaces, for example the top plate. Subsequently, the other surface is brought into contact with the coated surface and the adhesive is cured by air exposure or via irradiation with a light source. Liquid curable bonding materials or adhesives may be elastomeric, for example, thermoplastic elastomers, and natural or synthetic rubbers, polyurethanes, and silicones. Elastomeric bonding materials may or may not require pressure to seal the channel system. They may also provide closure and sealing to small irregularities in the opposed surfaces by conforming to the substrates of the channel system.

A channel system may also be formed and sealed in cases where two surfaces are being joined and one of the surfaces has one or more apertures. In order to promote bonding between these two surfaces, a vacuum may be applied to the apertures. Bonding may then be accomplished by thermal methods or after previously having applied a bonding material or adhesive.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A flow control device having a fluid pathway comprising a micro-channel having a first segment having an inner wall and being of a first radius, a second tapered segment having an inner wall, a third segment having an inner wall and second radius greater than said first radius, said inner wall of second tapered segment extending from said inner wall of said first segment toward said inner wall of said third segment at an acute angle and having an initial radius and a third radius substantially equal to said second radius of said third segment and means within said fluid pathway for achieving flow rate stabilization by providing viscosity dependent resistance to fluid flow along said fluid pathway, said means comprising a stationary vane protruding into said fluid pathway, said vane being constructed and arranged to produce an eddy within the fluid flowing along said micro-channel, said vane having a thickness of between about 5 μm and about 100 μm.

2. The device as defined in claim 1 in which said inner wall of second tapered segment extends from said inner wall of said first segment toward said inner wall of said third segment at an angle of between approximately 30 degrees and approximately 60 degrees.

3. The device as defined in claim 1 which said inner wall of second tapered segment extends from said inner wall of said first segment toward said inner wall of said third segment at an angle of approximately 30 degrees in which said vane is constructed and arranged to produce an eddy within the fluid flowing along said fluid pathway.

4. The device as defined in claim 1 which said inner wall of second tapered segment extends from said inner wall of said first segment toward said inner wall of said third segment at an angle of approximately 60 degrees.

5. The device as defined in claim 1 in which said vane extends from said wall at an angle of between about 15 degrees and about 75 degrees.

6. The device as defined in claim 1 in which said vane has a length of between about 25 μm and about 1,000 μm.

7. A flow rate stabilization device for stabilizing the rate of fluid flow through the device comprising:
(a) a housing having a fluid flow path comprising a micro-channel having a first segment having an inner wall and being of a first radius, a second tapered segment having an inner wall and a third segment having an inner wall and being of a second radius greater than said first radius, said second tapered segment having an initial radius and a third radius substantially equal to said second radius of said third segment, said inner wall of second tapered segment extending from said inner wall of said first segment toward said inner wall of said third segment at an angle of between about 30 degrees and about 60 degrees; and
(b) an obstacle connected to said housing and positioned within said micro-channel in a manner to generate an eddy that provides viscosity dependant resistance to the flow of fluid along said fluid flow path.

8. The device as defined in claim 7 in which said obstacle comprises a vane extending into said fluid flow path.

9. The device as defined in claim 7 in which said obstacle comprises a vane affixed to said wall and extending into said micro-channel.

10. The device as defined in claim 9 in which said vane extends from said wall at an angle of between about 15 degrees and about 75 degrees.

11. The device as defined in claim 10 in which said vane has a length of between about 25 μm and about 1,000 μm.

12. The device as defined in claim 11 in which said vane has a thickness of between about 5 μm and about 100 μm.

13. A fluid flow control device comprising:
(a) a housing having a fluid pathway comprising a micro-channel having a wall, a first segment having an inner wall and being of a first radius, a second tapered segment having an inner wall, a third segment having an inner wall and a second radius greater than said first radius, said second tapered segment having an initial radius of a magnitude intermediate between the magnitudes of said first radius of said first segment and said second radius of said third segment and a final radius substantially equal to said second radius of said third segment, said inner wall of second tapered segment extending from said inner wall of said first segment toward said inner wall of said third segment at an acute angle; and
(b) a plurality of stationary vanes affixed to said wall and extending into said micro-channel in a manner to create an eddy current within the fluid flowing along said fluid pathway.

14. The device as defined in claim 13 in which said inner wall of second tapered segment extends from said inner wall of said first segment toward said inner wall of said third segment at an angle of between about 30 degrees and about 60 degrees.

15. The device as defined in claim 13 in which said plurality of stationary vanes are randomly positioned.

16. The device as defined in claim 13 in which said vanes extend generally perpendicularly from said wall.

17. The device as defined in claim 13 in which said vanes have a length of between about 50 μm and about 200 μm.

18. The device as defined in claim 13 in which said vanes have a thickness of between about 5 μm and about 10 μm.

19. The device as defined in claim 13 in which said radius of said first segment is between about 80 μm and about 110 μm.

20. The device as defined in claim 19 in which said radius of said third segment is about 800 μm.

* * * * *